Nov. 10, 1942. R. W. ANDREWS, JR., ET AL 2,301,674
WORK HANDLING APPARATUS
Filed Jan. 18, 1940   2 Sheets-Sheet 1
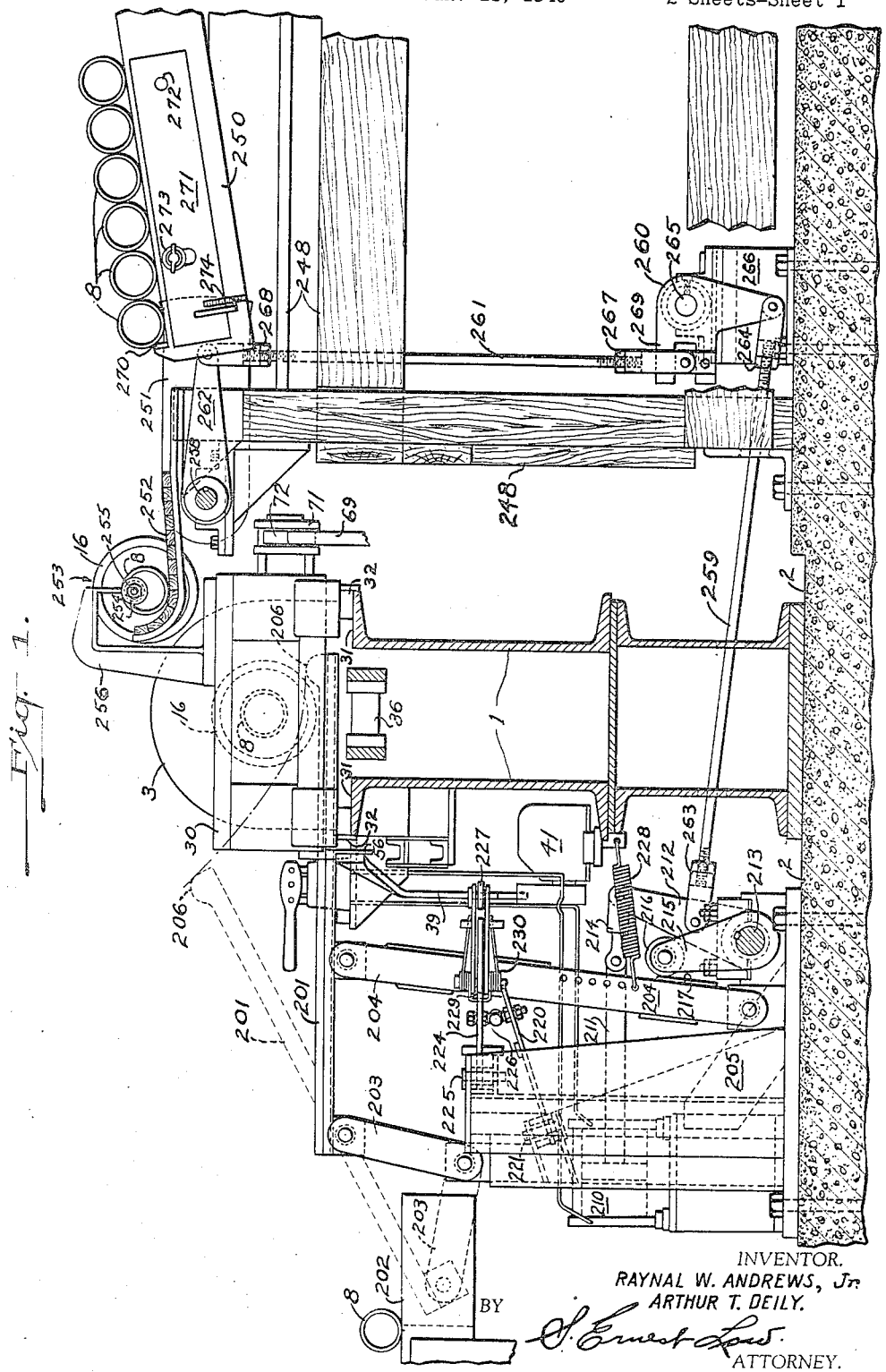
INVENTOR.
RAYNAL W. ANDREWS, Jr.
ARTHUR T. DEILY.
BY
S. Ernest Low
ATTORNEY.

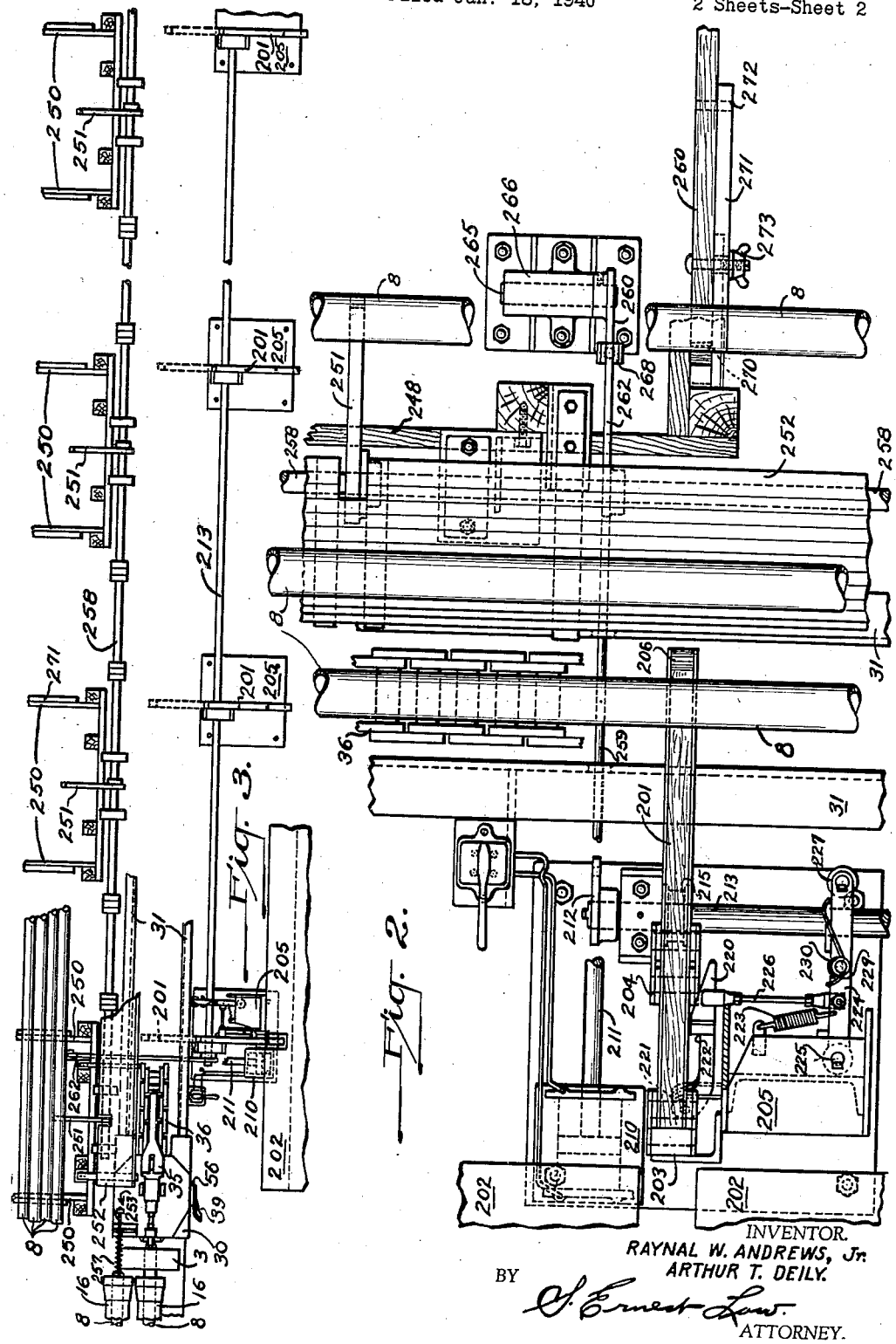

Patented Nov. 10, 1942

2,301,674

UNITED STATES PATENT OFFICE 2,301,674

WORK HANDLING APPARATUS

Raynal W. Andrews, Jr., New Kensington, and Arthur T. Deily, Pittsburgh, Pa., assignors to Aluminum Company of America, Pittsburgh, Pa., a corporation of Pennsylvania Application January 18, 1940, Serial No. 314,420

17 Claims. (Cl. 205—3)

This invention relates to apparatus for handling work pieces delivered successively to a predetermined position. It relates more particularly to apparatus for unloading work pieces from a draw bench or the like which delivers work pieces to a predetermined work release position, which may be employed in connection with loading apparatus.

The invention will be described in connection with its use for handling work pieces at a draw bench such as that described in our copending United States application entitled, "Metal working apparatus," Serial No. 288,163, filed August 3, 1939; but the invention is not to be considered limited to use with the draw bench therein disclosed or to use with draw benches only, since it is adapted for handling work pieces at any of many other types of apparatus which deliver work pieces to a predetermined position from which they are to be released and removed. Thus the invention will have application to the handling, not only of drawn tubes, shapes, and bars, but also to the handling of extruded or rolled tubes, shapes, or bars and also other extruded, rolled, or otherwise processed or delivered work pieces or articles.

It is among the objects of the present invention to facilitate the handling of work pieces successively delivered to a predetermined work release position.

Another object of the invention is to provide apparatus for conveniently removing a work piece from a predetermined delivery or work release position and for depositing it on a discharge rack or table.

Another object is to provide apparatus adapted for insertion under a work piece, to which the work piece may be released, for lifting and discharging the work piece laterally.

Another object of the invention is to provide a plurality of work handling members adapted to be successively inserted under a work piece and which may be simultaneously actuated to remove the work piece. It is also an object of the invention to provide a plurality of work handling members, only as many of which need be rendered operative as is necessary to accommodate the particular length of work piece to be handled.

A further object of the invention is the provision of apparatus for removing work pieces from a draw bench, which apparatus includes at least one member adapted to be inserted under the work piece and over the driving element for actuating the draw bench. Other objects and advantages of the present invention will appear on a reading of the following description in connection with the drawings; they will include general objects, singly or together, of associating apparatus for loading, working, and unloading work pieces to form cooperative work processing and handling equipment.

In the drawings:

Fig. 1 is a side elevation of one of the work handling members and the apparatus associated therewith, including a section of the draw bench and a sectional elevation of work loading apparatus therefor, a work piece being ready for removal and a second work piece being ready to be loaded into a draw bench work supporting shell;

Fig. 2 is a plan view of the apparatus shown in Fig. 1; and

Fig. 3 is a general plan view of the delivery side of the draw bench showing a plurality of work handling members disposed along the draw bench and showing also the work loading apparatus for the draw bench, a work piece having been loaded into a supporting shell and a second work piece being ready to be drawn.

Since this invention is best described in connection with its use for unloading work pieces from a draw bench, brief reference is here made to the draw bench disclosed in our copending application above mentioned. Portions of this draw bench are illustrated in the drawings contained herein and bear, as far as conveniently possible, the same reference numerals as are used in our copending application.

The draw bench there described comprises two rotatably mounted mandrel rods adapted for handling a work piece to a die. The mandrel rods have associated therewith tubular protective and supporting shells 16, indicated by that reference numeral on the drawings herein contained. When one of the tubular shells 16 is in alignment with the drawing die, it will, in association with the mandrel therein, support a tube 8 to be drawn through the die located in die head 3. The tube 8 is adapted to be drawn through the die by means of the draw head or carriage 30, movable along the drawing portion of the draw bench frame 1 supported on foundation 2 by means of the draw chain 36 engaged by the carriage hook 35 (Fig. 3.) Draw head or carriage 30 will then be traversed by draw chain 36 along the tracks 31 on draw bench frame 1, carriage 30 rolling on wheels 32.

For purposes explained in our copending application, the carriage 30 carries a hook release lever

71 bearing on its outer end a cam follower roller 72 adapted to be engaged by a cam 69 such as is shown in Fig. 1 of the drawings. No further reference need be made here to this function of the lever 71.

The carriage 30 likewise has secured to one or both sides thereof a tie plate or plates 56 to which the carriage return chain or chains may be secured. As show in Fig. 1, to the tie plate 56 on the side of carriage 30 opposite to the hook release lever 71, there is secured a trip arm 39 employed to actuate various limit switches such as 41 located along the draw bench frame 1 for controlling, or instituting various changes in the operation of the draw bench. In the present preferred form of the invention this trip arm 39 is also adapted to release a latch 220 associated with the handling equipment to be hereinafter described.

While the detailed operation of the draw bench will be found fully explained in our copending application, it is here noted that the action of carriage 30 upon approach to die head 3 is to engage the pointed end of the work piece or tube 8 as the hook 35 falls into the chain 36. Thereafter the chain 36 is adapted to pull carriage 30, and thereby pull tube 8 through die head 3 as the carriage 30 moves outwardly along the draw bench frame 1. The space above the chain 36 in the path of carriage 30 must obviously be free of obstructions to the passage of carriage 30, but after the carriage 30 has passed outwardly along the bench an appreciable distance, the worked position of the work piece 8 will be end-supported between the carriage 30 and the die head 3, and there will be space between the work piece 8 and the chain 36 for the insertion of work handling members adapted to receive the work piece and carry the same away. The present invention utilizes this available space for this purpose during the time it is free and leaves the space unobstructed for the return movement of the carriage 30 to the die head 3.

Apparatus is also here disclosed for the loading of a second tube 8 into a mandrel shell 16 by utilizing the carriage 30 as a pushing means for so doing on its return movement to the die head 3. The apparatus shown to the right of the drawings in Figs. 1 and 2 and shown on the upper half of Fig. 3 are provided for this purpose and will be described after description of the work handling apparatus for unloading is described.

The work handling apparatus for unloading work pieces from the draw bench after they have been drawn comprises essentially one unloading arm 201, but preferably several unloading arms 201 as shown in Fig. 3. They may be inserted under the drawn tube 8 and over the draw chain 36 as the tube is being drawn and may receive the tube 8 after its passage through the die and release by the drawing carriage 30, whereupon the tube 8 may be lifted by the unloading arm or arms 201 and discharged by gravity to the side of the draw bench or onto an unloading rack or storage platform 202.

Referring now more particularly to Figs. 1 and 2, one unloading arm 201 and its associated apparatus will now be described. The unloading arm 201 forms the connecting link of a four-bar linkage including a short crank lever 203 and a long crank lever 204, each crank lever being pivoted to a frame 205 at one end. The short crank lever 203 is pivotally connected at its other end to the outer end of unloading arm 201; and the long crank lever 204 is pivotally connected at its other end to the unloading arm 201 intermediate the ends thereof. The work receiving end of unloading arm 201 has an enlarged portion 206 thereon serving as a stop for work pieces. The four-bar linkage above described is arranged so that the crank levers 203 and 204, when substantially vertical, support the unloading arm 201 in substantially horizontal position with the portion thereof extending beyond the long crank lever 204 extending over and across chain 36 and under the delivery position for the tube 8 from which it will be released from the die and the drawing carriage 30. This position of the four-bar linkage is shown in full lines in Fig. 1. After the tube 8 has been released to fall a short distance and rest on unloading arm 201, the four-bar linkage may be actuated to move the unloading arm 201 into a laterally displaced inclined position shown in dotted lines in Fig. 1, whereby the tube 8 resting on the unloading arm 201 may roll or slide theredown onto the unloading rack 202. Likewise in Fig. 1 the dotted positions of crank lever 203 only is shown for the inclined position of unloading arm 201.

For moving the four-bar linkage and unloading arm 201 from the substantially horizontal work receiving position to the inclined work discharging position, there is provided the following mechanical linkage: A pressure cylinder 210 has extending therefrom a piston rod 211; the piston rod 211 is connected to a lever 212 on shaft 213 through a suitable adjustable clevis link 214 carrying pins at either end. Suitably keyed to shaft 213 is a cam lever 215 carrying a roller 216 adapted to bear against the long crank lever 204 of the four-bar linkage. It will appear, then, that motion of the piston rod 211 to the left, as viewed in Fig. 1, will cause partial rotation of shaft 213 and movement of the four-bar linkage to carry the unloading arm 201 into the inclined position, through the above described mechanical linkage, a suitable bearing plate 217 being provided on crank lever 204 for engagement by the roller 216.

For purposes which will be hereinafter described, it is desirable to latch the unloading arm 201 in the inclined discharging position. This is accomplished by means of a spring held latch 220 pivoted to frame 205 at 221 and which is adapted to engage and hold the crank lever 204 upon motion of the unloading arm 201 to the dotted position indicated in Fig. 1 in response to the action of pressure cylinder 210. In that position the shouldered portion 222 of latch 220 will be secured over a corner of crank lever 204 by the action of extension spring 223 shown in Fig. 2. Extension spring 223 is secured at one end to the frame 205 and at the other end to a trip lever 224 pivoted as at 225 to frame 205. Adjustable link 226 connects trip lever 224 and latch 220 so that extension spring 223 acts on latch 220 through trip lever 224 and link 226.

After the unloading arm 201 has been moved to inclined position and secured by the latch 220, the cam lever 215 may be returned to its retracted position away from crank lever 204 by the actuation of pressure cylinder 210 and the motion of piston rod 211, lever 212, and shaft 213. It is desirable to retract the cam lever 215 in this manner to permit lateral movement of the four-bar linkage for carrying or returning the unloading arm 201 into horizontal position, without interference, upon release of the latch 220 as will now be described.

As has been mentioned hereinabove, it is desirable that the unloading arm 201 be retained as by the latch 220 in the inclined position, the purpose being to hold it in inoperative position removed from the path of the carriage 30. After the carriage 30 has moved beyond the unloading arm 201 on its traverse of the draw bench while drawing the tube, it then becomes desirable at any time before the final withdrawal of the tube 8 from the die to insert the unloading arm 201 under the tube 8 and over the chain 36. It is preferable to cause the motion of unloading arm 201 to take place immediately following the passage of the drawing carriage 30 beyond the unloading arm 201. For this purpose the aforementioned trip arm 39 on the drawing carriage 30 is herein adapted to engage the aforementioned trip lever 224 to release the latch 220.

As it will appear by inspection of the drawings in Figs. 1 and 2, normally the trip lever 224 extends into the path of trip arm 39 and bears on its end a roller 227 adapted to be engaged by trip arm 39. As the trip arm 39 passes outwardly along the draw bench with the drawing carriage 30, it will displace the trip lever 224 against the action of extension spring 223 and pull the latch 220 about its pivot point 221 to release the shouldered portion 222 thereof from the crank lever 204. At this time the trip lever 224 will of course be moved sufficiently to permit the trip arm 39 to pass thereby as the carriage 30 proceeds to draw the work piece.

Upon release of the latch 220 from the crank lever 204, the crank lever 204 will be caused to return to its substantially vertical position, carrying the unloading arm 201 to its substantially horizontal position by the contraction of a coil spring 228 secured at one end at one of several selectable positions on the crank lever 204 and at the other end to the main frame of the draw bench, the coil spring 228 being then rendered operative by release of latch 220.

Following the motion of the crank lever 204 and the four-bar linkage in carrying the unloading arm 201 to its substantially horizontal position, and after the passage of the trip arm 39 beyond the trip lever 224, trip lever 224 and the latch 220 will again be returned to their normal position by extension spring 223. Thereafter, upon the complete withdrawal of the tube 8 from the die and the release of the tube 8 at the other end from the drawing carriage 30, the tube 8 will drop a short distance onto the unloading arm 201 which may be immediately moved to its inclined position by the aforementioned mechanical linkage associated with pressure cylinder 210 to deposit the tube 8 on the unloading rack 202, whereupon the latch 220 will again engage crank lever 204 and secure the unloading arm 201 in its inclined position.

With the unloading arm 201 secured in inclined position, the carriage may then be returned to the die head 3 without interference thereby. It is noted, however, that the trip arm 39 on the carriage 30 will again pass the trip lever 224, but the trip lever 224 is of jointed or hinged construction as at 229 so that the outer end thereof may bend at the joint 229 against the action of the torsion spring 230, to permit the trip arm 39 to pass thereby. After the trip arm 39 has passed thereby, the torsion spring 230 will again return the outer portion of the trip lever 224 to its normal outwardly extending position in readiness for the next cycle of operation which will be substantially as hereinabove described.

In the foregoing description, reference has been made to one unloading arm 201 and its associated apparatus as illustrated in Figs. 1 and 2. While it is permissible, by so forming an unloading arm 201 as to accommodate a tube 8 without other support, the preferred form of the invention incorporates a plurality of unloading arms 201 spaced at suitable intervals along the draw bench frame 1. A plurality of arms 201 are shown in Fig. 3; they have like four-bar linkages, latches 220, trip levers 224, and cam levers 215 associated therewith. In the apparatus associated with the unloading arms 201, other than the first unloading arm 201 shown adjacent die head 3, no additional pressure cylinder 210, piston rod 211, clevis link 214, or lever 212 is necessary, it being convenient merely to run the shaft 213 from the first unloading arm 201 and associated apparatus to and through the following unloading arms 201 and associated apparatus, as is shown in Fig. 3.

A particular advantage is secured with this arrangement in that all of the unloading arms 201 may be simultaneously moved from substantially horizontal to inclined position by the rotation of shaft 213. And on the next cycle of operation only those unloading arms 201 beyond which the drawing carriage 30 passes may be rendered operative and moved by coil springs 228 to receive the next tube 8. In this arrangement, then, only those unloading arms 201 which are necessary to accommodate the particular length of tube being drawn are rendered operative by the passage of the carriage 30 and trip lever 39 thereby, and at the same time sufficient and properly spaced unloading arms are moved under the work piece to receive, lift, and discharge the same.

It will be noted that each unloading arm 201 has an enlarged end portion 206 adapted to prevent tube 8 from rolling or sliding off the outer end thereof; and that the paths of the unloading arms 201 are determined by the proportional lengths and arrangement of the crank levers 203 and 204, and the unloading arms 201 in the four-bar linkages. The locus of the enlarged ends 206 of the unloading arms 201 is indicated on Fig. 1, and it will be noticed that the linkage is so arranged that this locus is always clear of the tube delivery or drawing position and clear of the draw chain 36. Likewise it will be noticed that not only a tilting movement of the unloading arms 201 is obtained, but also a lateral displacement of the unloading arms 201 is obtained to carry the work over to the unloading rack 202. While the advantages of the particular linkage for controlling the motion of unloading arms 201 is here set forth, the invention is not to be considered limited thereto as other motion controlling arrangements could be employed.

An additional function which the motion of the unloading arms 201 may be caused to initiate is that of releasing a new tube 8 from a loading rack 259 to be inserted within a tubular shell 16 of the draw bench. Apparatus performing this function is shown to the right in the drawings, Figs. 1 and 2 and in the upper portion of Fig. 3, for the purpose of disclosing a complete association of the invention as employed in a draw bench or the like.

In the draw bench disclosed in our copending application there are two tubular shells 16 adapted to receive and support tubes 8 in conjunction with the mandrels therein. By the provision of such two tubular shells and mandrels it is possible to load a new tube into a tubular shell 16 while the second tubular shell 16 remains in alignment with the die. A convenient automatic loader for the draw bench comprises the inclined loading rack 250, in association with an escapement arm 251 adapted to lift one tube 8 from the loading rack 250 and cause it to roll or slide toward the draw bench onto a loading trough 252, the loading trough 252 being adapted to receive a tube 8 and hold it in alignment with a tubular shell 16. For loading the tube 8 into the shell 16 a pusher 253 is provided on the carriage 30 arranged to push the tube into the shell 16 as the carriage 30 is traversed back to the die head 3. The pusher 253 comprises a pusher button 254 (Fig. 1) secured at the end of a rod 255 held in a bracket 256 secured to the carriage 30. Between the button 254 and the frame 256 there is secured a suitable compression spring 257 (Fig. 3) arranged so that the rod 255 and button 254 may be displaced slightly thereagainst to allow for over-travel of the carriage 30 with respect to the tube 8 and tubular shell 16.

The loading trough 252 is adjustably secured to the frame 248; and escapement arm 251 is mounted on a shaft 258 supported from frame 248. The shaft 258 may be rotated slightly in either direction by means of the aforementioned pressure cylinder 210 through a mechanical linkage consisting of connecting rod 259, bell crank 260, connecting rod 261, and lever 262. The connecting rod 259 is secured to the lever 212 at one end and to one arm of the bell crank 260 at the other end by suitable clevis connections as at 263 and 264, the clevis connections being adjustably secured to the connecting rod 259. The bell crank 260 is oscillatable about a pin 265 held in bearing 266 secured to foundation 2. The other end of the bell crank 260 is connected to the lever 262 on shaft 258 by means of the connecting rod 261 through suitable clevis connections as at 267 and 268, the clevis connections being adjustably secured to the connecting rod 261.

From this arrangement it will appear that pressure cylinder 210 is arranged not only to move the unloading arms 201 to inclined position, but also to release a tube 8 to the loading trough 252. The relative position of the loading trough 252 may be adjusted with respect to frame 248; and the relative position of escapement arm 251 may be adjusted by changing the lengths of connecting rods 259 or 261, or by changing the radius at which connecting rod 261 is secured to the arm 269 of bell crank 260. This adjustment will accommodate various sizes of tubes 8 and insure that the loading trough 252 is at the proper level for the insertion of a tube 8 into the tubular shell 16.

Likewise a stop 270 at the end of the loading rack 250 may be adjusted or changed to one of a larger or smaller size so as to locate the tube 8 at the bottom of the loading rack 250 in proper position for the engagement thereof by the escapement arm 251, which will, at the same time it releases a tube 8, prevent more than one tube from passing down into the loading trough 252. After a tube 8 has passed to the loading trough 252, the escapement arm will return to its normal position, shown in Fig. 1, to permit the next tube 8 to roll or slide to the stop 270 at the bottom of the loading rack 250.

Likewise, where it is desirable to adjust the relative height of the stop 270, a rack member 271 may be moved about a pivot point 272 on the loading rack 250 into a position such as to change the effective inclination of rack 250, where it may be secured by the tightening of the wing nut 273 shown for that purpose. A gauge 274 is provided for indicating the position of rack member 271.

As in the case of the unloading arms 201, the loading rack 250 may include a plurality of spaced sections and there may be a plurality of escapement arms 251 on shaft 258 along the length of the draw bench frame 1 as is shown in Fig. 3, the actuating mechanism for the shaft 258 being confined to the first section of the loading rack 250 as hereinabove described. It is preferable that the loading trough 252 be continuous and supported by the frame 248.

The preferred operation of an organization of apparatus incorporating a loading apparatus for a draw bench, a draw bench, and an unloading apparatus for a draw bench conforming to our invention as disclosed in our copending application and in the present application, briefly will be as follows:

An unworked tube 8 deposited on a loading rack 250 will approach by gravity the stop 270 on the loading rack 250. At this position the oscillation of the escapement arms 251, by movement first in a counterclockwise direction, will lift and carry a tube 8 for gravity movement to the trough portion of feed trough 252, the oscillation of the escapement arms 251 being effective through the rotation of shafts 213 and 258 in counterclockwise and then clockwise directions, as viewed in Fig. 1, which will occur at the end of a drawing cycle when the carriage 30 is at the outer end of the draw bench frame 1 away from the die head 3. Thereupon the return movement of the drawing carriage 30 will begin and the pusher 253 on the drawing carriage 30 will push the tube 8 from the feed trough 252 into the tubular shell 16. When the carriage 30 comes to rest at the die head 3, the tubular shell 16 will be rotated to align the tubular shell 16, carrying the unworked tube 8, with the die, whereupon the mandrel associated therewith will insert the tube 8 through the die.

Then the hook 35 of the drawing carriage 30 will be released to fall into chain 36 and at the same time the jaws of the drawing carriage will be engaged with the tube 8. Upon motion of the draw chain 36, the carriage 30 will be moved outwardly along the draw bench frame 1 to pull the tube 8 through the die. Motion of the drawing carriage along the bench will successively trip the trip levers 224, releasing the latches 220 and permitting the unloading arms 201 to be returned under the tube 8 and over the chain 36 by the action of coil spring 228.

Upon the withdrawal of the tube 8 from the die, it will be released from the drawing carriage 30 and fall on the unloading arms 201. At the same time the carriage 30 will come to rest. Thereupon the pressure cylinder 210 may be actuated to rotate shaft 213, and, through cam lever 215, cause the unloading arms 201 to be simultaneously moved to inclined discharging position, whereupon the tube 8 will roll or slide from the inclined arms 201 onto the unloading rack 202. At the same time the rotation of shaft 213, through the aforementioned linkages, will cause the rotation of shaft 258 and the release of a following unworked tube 8 to the feed trough 252 in readiness for the next cycle of operation. Thus it will appear that a complete organization for automatic operation of a draw bench is made possible by the invention herein disclosed.

It is intended that the invention herein claimed be not limited to a draw bench since it may be applied to other apparatus wherein a work piece is delivered or released at a predetermined position, and is to be handled or unloaded in the manner of our invention. Numerous modifications and changes in the relations of the parts may be made without departing from the scope of our invention. Such modifications and changes are intended to be included within the scope of the appended claims.

We claim as our invention:

1. In an apparatus of the character described, the combination comprising a member for handling work released at a predetermined position, means for moving said member in a plane transverse to said work release position and from a substantially horizontal position upwardly into an inclined position for discharging a work piece carried thereby, means for returning said member in said plane into a substantially horizontal position under said work release position for handling a succeeding work piece, and means for guiding said member at least on the return movement thereof around and under said work release position.

2. In an apparatus of the character described, the combination comprising a member for handling work released at a predetermined position, means for moving said member in a plane transverse to said work release position and from a substantially horizontal position upwardly into an inclined position tilted away from said work release position for discharging a work piece carried thereby, latching means for retaining said member in said inclined position, latch releasing means, means rendered operative by said latch releasing means for returning said member in said plane into a substantially horizontal position under said work release position for handling a succeeding work piece, and means for guiding said member at least on the return movement thereof around and under said work release position.

3. For use with an apparatus delivering successive work pieces to a predetermined position, the combination comprising a member for handling work released at a predetermined position forming the connecting link of a four-bar linkage, crank levers of said linkage being substantially vertically disposed when supporting said member in horizontal work receiving position, and one longer than the other, said member having a portion thereof extending toward said work release position beyond the longer crank lever of said linkage, linkage actuating means for moving said member in a plane transverse to said work release position and from a substantially horizontal position upwardly into an inclined position for discharging a work piece carried thereby, and linkage actuating means for returning said member in said plane into a substantially horizontal position under said work release position for handling a succeeding work piece, whereby the four-bar linkage guides the work handling member on the return movement thereof around and under the work release position.

4. For use with an apparatus delivering successive work pieces to a predetermined position, the combination comprising a member for handling work released at a predetermined position forming the connecting link of a four-bar linkage, crank levers of said linkage being substantially vertically disposed when supporting said member in horizontal work receiving position, and one longer than the other, said member having a portion thereof extending toward said work release position beyond the longer crank lever of said linkage, linkage actuating means for moving said member in a plane transverse to said work release position and from a substantially horizontal position upwardly into an inclined position tilted away from said work release position for discharging a work piece carried thereby, latching means for retaining said member in said inclined position, latch releasing means, and linkage actuating means rendered operative by said latch releasing means for returning said member in said plane into a substantially horizontal position under said work release position for handling a succeeding work piece, whereby the four-bar linkage guides the work handling member on the return movement thereof around and under the work release position.

5. In a work handling apparatus, the combination comprising a four-bar linkage disposed in a substantially vertical plane, said linkage including two crank levers, one of said crank levers of said linkage being shorter than the other, a link connecting said crank levers extending beyond the longer crank lever and serving as a work handling member, said crank levers being substantially vertically disposed when supporting said member in horizontal work receiving position, and linkage actuating means for moving said work handling member in said plane to and from substantially horizontal and inclined positions, whereby the work handling member may be inserted around and under a work piece to receive the same and upwardly tilted to discharge the same.

6. In a work handling apparatus, the combination comprising a four-bar linkage disposed in a substantially vertical plane, said linkage including two crank levers, one of said crank levers of said linkage being shorter than the other, a link connecting said crank levers extending beyond the longer crank lever and serving as a work handling member, said crank levers being substantially vertically disposed when supporting said member in horizontal work receiving position, to and from substantially horizontal and inclined positions, and latching means for retaining said work handling member in inclined position adapted to permit said linkage actuating means to move said work handling member into substantially horizontal position upon release thereof, whereby the work handling member may be inserted around and under a work piece to receive the same and upwardly tilted to discharge the same.

7. In an apparatus of the character described, the combination comprising a plurality of members for handling work released at a predetermined position and disposed transversely thereof, means for moving said members in planes transverse to said work release position and from substantially horizontal positions upwardly into inclined positions for discharging a work piece carried thereby, means for returning each of said members in said planes into substantially horizontal positions under said work release position for handling a succeeding work piece, and means for guiding each of said members at least on the return movement thereof around and under said work release position.

8. In an apparatus of the character described, the combination comprising delivery means for bringing successive work pieces to a predetermined work release position, a plurality of members for handling work released at said work release position and disposed transversely thereof, means for simultaneously moving said members in planes transverse to said work release position and from substantially horizontal positions upwardly into inclined positions for discharging a work piece carried thereby, latching means for retaining each of said members in said inclined positions, latch releasing means for each of said members actuated by said delivery means, means rendered operative by said latch releasing means for independently returning each of said members in said planes into substantially horizontal positions under said work release position for handling a succeeding work piece, and means for guiding each of said members at least on the return movement thereof under said work release position.

9. For use with an apparatus delivering successive work pieces to a predetermined position, the combination comprising a plurality of members for handling work released at a predetermined position and disposed transversely thereof, each of said members forming the connecting link of a four-bar linkage, each pair of crank levers being substantially vertically disposed when supporting a said member in horizontal work receiving position, and one longer than the other, each of said members having a portion thereof extending toward said work release position beyond the longer crank lever of said linkage, linkage actuating means for moving said members in planes transverse to said work release position and from substantially horizontal positions upwardly into inclined positions for discharging a work piece carried thereby, and linkage actuating means for returning each of said members in said planes into substantially horizontal positions under said work release position for handling a succeeding work piece, whereby the four-bar linkages guide the work handling members on the return movement thereof around and under the work release position.

10. For use with an apparatus delivering successive work pieces to a predetermined position, the combination comprising delivery means for bringing successive work pieces to a predetermined work release position, a plurality of members for handling work released at said work release position and disposed transversely thereof, each of said members forming the connecting link of a four-bar linkage and having a portion thereof extending toward the said work release position beyond a longer crank lever of said linkage, linkage actuating means for simultaneously moving said members in planes transverse to said work release position and from substantially horizontal positions upwardly into inclined positions for discharging a work piece carried thereby, latching means for retaining each of said members in said inclined positions, latch releasing means for each of said members actuated by said delivery means, and linkage actuating means rendered operative by said latch releasing means for independently returning each of said members in said planes into substantially horizontal positions under said work release position for handling a succeeding work piece, whereby the four-bar linkages guide the work handling members on the return movement thereof under the work release position.

11. In a work handling apparatus, the combination comprising a plurality of four-bar linkages disposed in substantially vertical planes transverse to a predetermined work release position, each of said linkages including two crank levers, one of said crank levers being shorter than the other, and a link connecting said crank levers extending beyond the longer crank lever toward said work release position and serving as a work handling member, said crank levers being substantially vertically disposed when supporting said member in horizontal work receiving position, and linkage actuating means for moving said work handling members in said planes to and from substantially horizontal and inclined positions, whereby the work handling members may be inserted around and under a work piece to receive the same and upwardly tilted to discharge the same.

12. In a work handling apparatus, the combination comprising delivery means for bringing successive work pieces to a predetermined work release position, a plurality of four-bar linkages disposed in substantially vertical planes transverse to said work release position, each of said linkages including a pair of crank levers, one of said crank levers being shorter than the other, and a link connecting said crank levers extending beyond the longer crank lever toward said work release position and serving as a work handling member, linkage actuating means for moving said work handling members in said planes to and from substantially horizontal and inclined positions, latching means for retaining each of said work handling members in said inclined positions, and means actuated by said delivery means for successively and independently releasing said latching means to render said linkage actuating means operative to move said work handling members into substantially horizontal position, whereby the work handling members may be inserted under a work piece to receive the same and upwardly tilted to discharge the same.

13. In combination with a drawing apparatus, a horizontally movable work drawing mechanism, a plurality of work unloading arms arranged for movement in planes transverse to the drawing apparatus, means actuated by said work drawing mechanism for moving successive work unloading arms in said planes from inclined work discharging position into substantially horizontal work receiving position under the work being drawn, and means for simultaneously moving said work unloading arms in said planes from said work receiving positions upwardly into said work discharging positions.

14. In combination with a drawing apparatus, a horizontally movable work drawing member, a plurality of work unloading members disposed along said drawing apparatus adjacent the path of said drawing member and arranged for movement in planes transverse to the drawing apparatus, each of said work unloading members forming a connecting link of a four-bar linkage and extending beyond a longer crank lever included in said linkage toward the drawing apparatus, means actuated by the passage of said drawing member by successive work unloading members for actuating successive linkages to move said work unloading members in said planes from inclined work discharging positions into substantially horizontal positions under the work being drawn, means for simultaneously actuating said linkages to move said work unloading members in said planes from said substantially horizontal positions under the work being drawn upwardly into said inclined work discharging positions, and means for retaining said work handling members in said inclined positions until again actuated by drawing movement of said drawing member.

15. In combination with a draw bench, a draw head movable therealong by means of a driving element, means for unloading a work piece from the draw bench comprising a plurality of arms adapted for insertion under a work piece being drawn by said draw head and over said driving element, means for upwardly tilting said arms in planes transverse to the draw bench to unload a work piece received thereon, and means actuated by said draw head for returning said arms in said planes from tilted position to substantially horizontal work receiving position under the work piece being drawn and over said driving element.

16. In combination a draw bench, a draw head movable therealong by means of a driving element, means for unloading a work piece from the draw bench comprising a plurality of arms adapted for insertion under a work piece being drawn by said draw head and over said driving element, means for upwardly tilting said arms in planes transverse to the draw bench to unload a work piece received thereon, means actuated by said draw head for returning said arms in said planes from tilted position to substantially horizontal work receiving position, a work loading rack, and means directly actuated by movement of said work handling members into tilted position for releasing a work piece from said loading rack to the draw bench.

17. In an apparatus of the class described a four bar linkage having two crank arms, one longer than the other, and a connecting link extended beyond the longer crank arm for use as a work handling member, said crank arms being substantially vertical when said link-member is substantially horizontal under a work release position, and means for actuating said linkage to move said link-member toward the shorter crank arm from substantially horizontal to tilted position to lift and reject a work piece borne thereon and return, whereby the link-member may be returned even though a work piece is in the work release position.

RAYNAL W. ANDREWS, JR.
ARTHUR T. DEILY.

CERTIFICATE OF CORRECTION.

Patent No. 2,301,674. November 10, 1942.

RAYNAL W. ANDREWS, JR., ET AL.

It is hereby certified that error appears in the printed specification of the above numbered patent requiring correction as follows: Page 2, first column, line 34, for the word "position" read --portion--; page 5, second column, line 52, claim 6, before "to" insert --linkage actuating means for moving said work handling-member in said plane--; and that the said Letters Patent should be read with this correction therein that the same may conform to the record of the case in the Patent Office.

Signed and sealed this 22nd day of December, A. D. 1942.

Henry Van Arsdale,
Acting Commissioner of Patents.

(Seal)